(No Model.)
2 Sheets—Sheet 1.
F. E. FISHER.
MAGNETO ELECTRIC MACHINE.
No. 336,000. Patented Feb. 9, 1886.
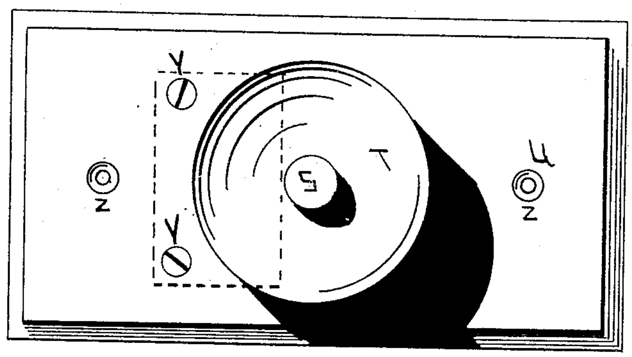
Fig=1
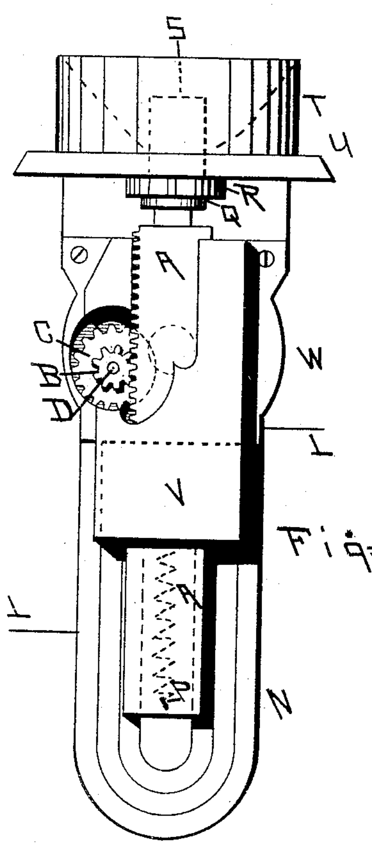
Fig=2
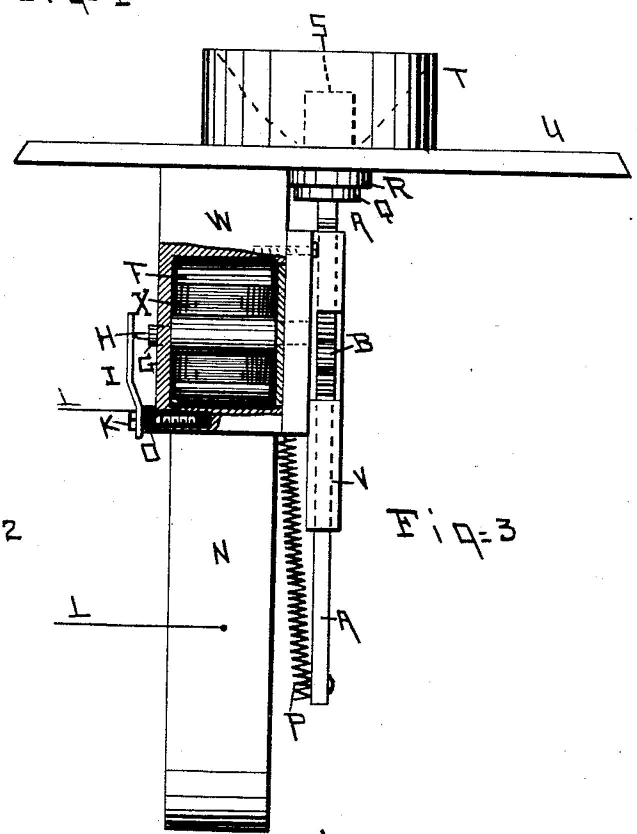
Fig=3
ATTEST
Geo. A. Weed
Jno. C. Grout.
INVENTOR
Frank E. Fisher
by Geo. H. Lothrop
ATTORNEY
N. PETERS, Photo-Lithographer, Washington, D. C.

(No Model.)
2 Sheets—Sheet 2.
F. E. FISHER.
MAGNETO ELECTRIC MACHINE.
No. 336,000.
Patented Feb. 9, 1886.
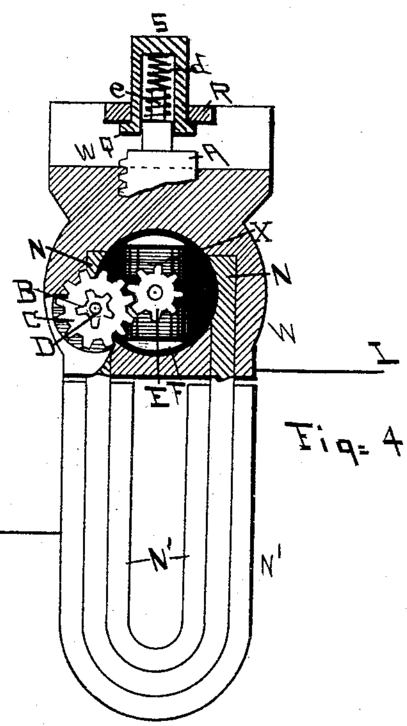
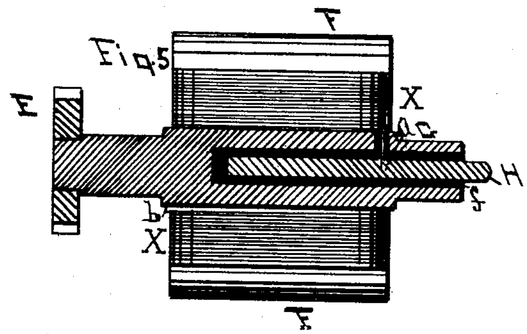
ATTEST
Jno. C. Groux
INVENTOR
Frank E. Fisher
by Geo H Lothrop
ATTORNEY
N. PETERS. Photo-Lithographer, Washington, D. C.

UNITED STATES PATENT OFFICE.

FRANK E. FISHER, OF DETROIT, MICHIGAN.

MAGNETO-ELECTRIC MACHINE.

SPECIFICATION forming part of Letters Patent No. 336,000, dated February 9, 1886.

Application filed July 14, 1885. Serial No. 171,599. (No model.)

*To all whom it may concern:*

Be it known that I, FRANK E. FISHER, of the city of Detroit, in the county of Wayne and State of Michigan, have invented a new and useful Improvement in Magneto-Electric Machines, of which the following is a specification.

My invention consists in a new arrangement of a magneto-electric machine whereby it can be operated by a push-button instead of a crank, and thus made available for use in houses for ringing bells and annunciators in place of the battery ordinarily employed therefor.

Figure 1 is an elevation of the push-button and case, with the plate which carries the magneto. Fig. 2 is a side elevation of the magneto. Fig. 3 is a side elevation of the magneto, turned one-quarter around from the position shown in Fig. 2, partially in section. Fig. 4 is an elevation similar to Fig. 2, with the upper part in section. Fig. 5 is a section through the center of the armature-shaft.

N represents a permanent magnet of U shape, with its poles concave on their inner surfaces to permit the rotation of the armature between them.

N' N' represent re-enforcing U-shaped permanent magnets, shorter than the main magnet, and lying within and without the main magnet, and I prefer to use them to gain additional power in a small space, though they may be omitted if desired.

The upper ends of the main magnet N, or the poles thereof, are embedded in a casting of lead or other suitable soft diamagnetic metal, W, which forms the frame to carry the working parts of the magneto, and by this means I am enabled to form the magneto very cheaply, as the magnet can be placed in a mold and melted lead poured around the poles.

X represents an armature consisting of a shaft, *b*, journaled in the frame W, a core, F, made of any suitable form and of such size as to rotate closely within the poles of the magnet N, and wound with insulated wire in the usual manner. One end of the armature-shaft *b* is bored out for a portion of its length, as shown at *f*, Fig. 5, and in this bore is set a metal rod, H, insulated from shaft *b*, as indicated at *f* in Fig. 5, and projecting beyond the end of said shaft. One end of the armature-winding is connected to rod H, as shown at *a*, and the other end is connected to the shaft *b*.

I represents a contact-spring secured to the frame W by the screw K, but insulated from the screw and frame by insulating material O, and the free end of contact-spring I bears against the projecting end of rod H.

L L represent the wires which form the circuit, and in which at any convenient point is placed an ordinary alternating current-bell or annunciator-drop, one end of the circuit being connected with contact-spring I and the other with the magnet or any part of the frame, so that the circuit of the machine is completed through rod H, contact-spring I, wires L, the frame of the machine, shaft *b*, and the armature-winding.

E represents a pinion secured to the end of the armature-shaft.

C represents a gear-wheel secured to a shaft, D, journaled in frame W, and adapted to mesh with pinion E; and B represents a pinion, also secured on shaft D.

A represents a toothed rack placed and adapted to slide in a way, V, formed on one side of frame W, so that its teeth will mesh with the teeth of the pinion B, whereby motion communicated to rack A will rotate pinion B and gear-wheel C, and thus cause the armature to rotate rapidly.

P represents a spring one end of which is attached to frame W and the other end to the end of rack A, and tends to constantly hold rack A at one end of its stroke.

U represents a plate to which the magneto is attached by screws Y Y, and provided with screw-holes Z Z, to permit its attachment to a wall or casing.

S represents a push-button, made in the shape of a hollow cylinder, closed at one end, and having at the other end the annular flange Q, which prevents the push-button from coming out of the plate U. The end of rack A extends into the hollow of the push-button, and is surrounded by a coil-spring, *e*, Fig. 4, the object of which is to act as a buffer when the spring P throws rack A and the push-button out, and thus prevent injury to the teeth of the pinions and rack when the outward motion of the button is checked by the flange Q.

T represents an ordinary casing, of wood or any suitable material, surrounding the push-button S, and is secured to plate U in any suitable manner.

The operation of the magneto is similar to that of an ordinary magneto operated by a crank, and is so well understood as to need no description. The armature is rotated by pushing the button S, and thereby moving rack A, when the teeth on said rack rotate pinion B, and through wheel C and pinion E rotate the armature, and as soon as button E is released the spring P throws rack A in the contrary direction and rotates the armature until rack A has returned to its original position.

The speed of rotation of the armature can be increased or decreased by changing the proportions of the pinion and gear wheel.

What I claim as my invention, and desire to secure by Letters Patent, is—

1. A magneto-electric machine consisting of a U-shaped permanent soft-metal frame cast around the poles of the magnet, and an armature journaled in the frame, substantially as shown and described.

2. In a magneto-electric machine, a permanent magnet having its poles embedded in a soft-metal casting, an armature journaled upon said casting, and a rack gearing with a pinion upon the shaft of said armature, substantially as described.

3. The combination of the push-button S, rack A, spring P, and spring *d*, whereby the force of the spring P is checked gradually, substantially as shown and described.

FRANK E. FISHER.

Witnesses:
GEO. H. LOTHROP,
M. A. JACKSON.